Feb. 6, 1968     J. W. EWING     3,367,382
EXTENSIBLE TRACTION MEANS FOR VEHICLE WHEELS
Filed Aug. 10, 1965     2 Sheets-Sheet 1

INVENTOR.
JOHN W. EWING
BY

Feb. 6, 1968    J. W. EWING    3,367,382
EXTENSIBLE TRACTION MEANS FOR VEHICLE WHEELS
Filed Aug. 10, 1965    2 Sheets-Sheet 2
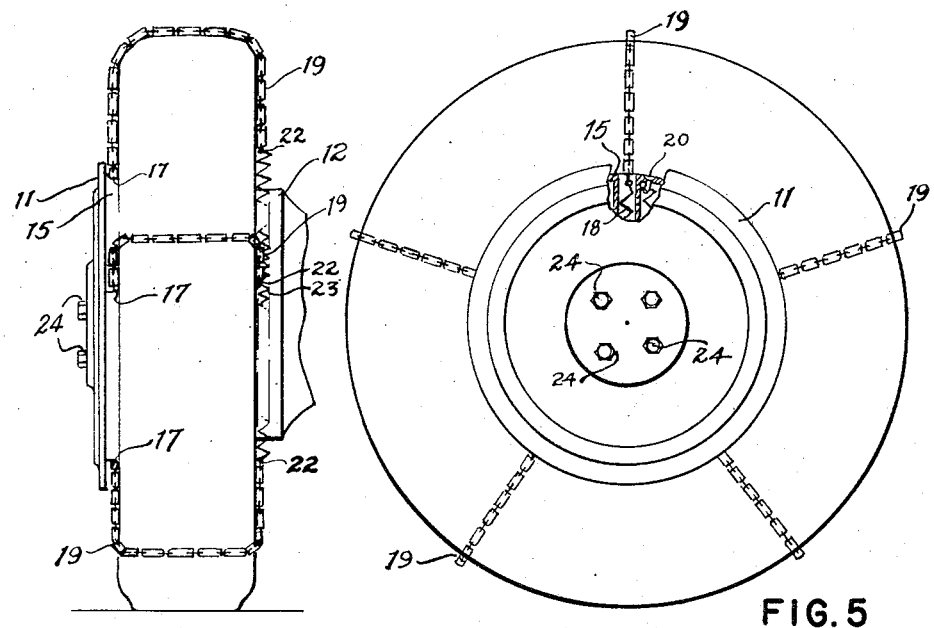
FIG. 6
FIG. 5
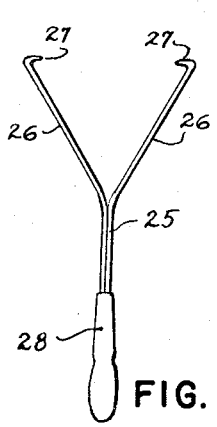
FIG. 8
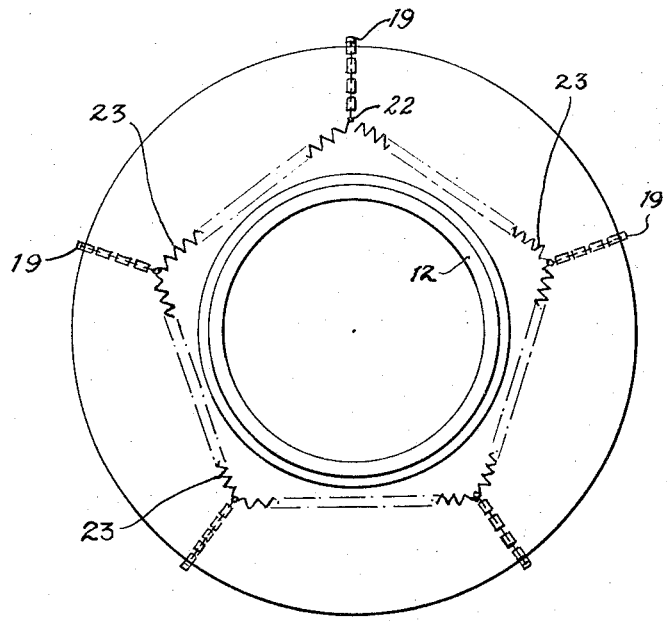
FIG. 7
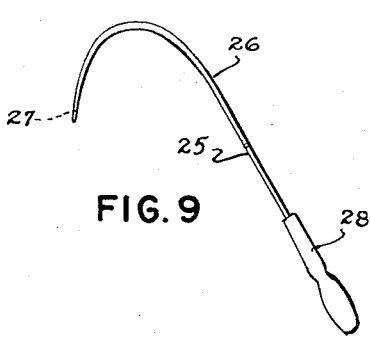
FIG. 9
INVENTOR.
JOHN W. EWING
BY United States Patent Office 3,367,382
Patented Feb. 6, 1968

3,367,382
EXTENSIBLE TRACTION MEANS FOR
VEHICLE WHEELS
John W. Ewing, 8836 Hunting Lane, Fox Rest Woods,
Apt. 203, Laurel, Md. 20810
Filed Aug. 10, 1965, Ser. No. 478,644
5 Claims. (Cl. 152—216)

This invention relates to traction devices for motor-driven vehicles, and more particularly to a self-contained unit mountable upon the driving wheels of said vehicles, for rapid extension to operating position.

It has for its object to provide a circular plate for mounting upon the hub of a vehicle outside the wheel, said plate having segmented areas in the plane thereof to provide for the storage of tire cross chains and extension means therefor.

A further object of the invention is to provide means for the extension of said tire cross chains from their segmented storage positions to extend over the tread of the tire mounted upon the wheel, and to be retracted from such position into the said storage areas.

Another object is to provide tension means whereby the extended ends of said tire cross chains may be held in place when the chains are in operating position upon the driving surface of the tire.

It is a further object of the invention to provide such self-contained mountable unit with means for rigid attachment upon the hub of a vehicle and for removal of said unit during periods when its use is not required.

With the above and other objects in view, this invention consists of the novel features, combination and arrangement of parts, hereinafter fully described, claimed and illustrated in the accompanying drawings forming part of this application, in which similar characters of reference indicate corresponding parts in all views, and in which:

FIGURE 5 is a front elevation showing the chains extended over a tire.

FIGURE 6 is an end elevational view, showing the device in an operating position.

FIGURE 7 is a rear elevational view, showing the chains and securing springs in operating position.

FIGURES 8 and 9 are detail views showing operating tools applicable to the traction device.

Figure 3:
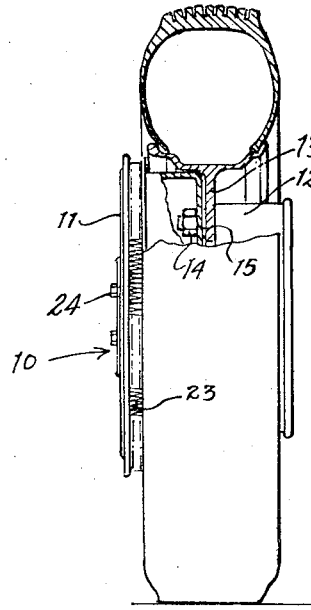
FIGURE 3 is an end elevational view, partly in section, showing the device in position on a wheel.
Figure 1:
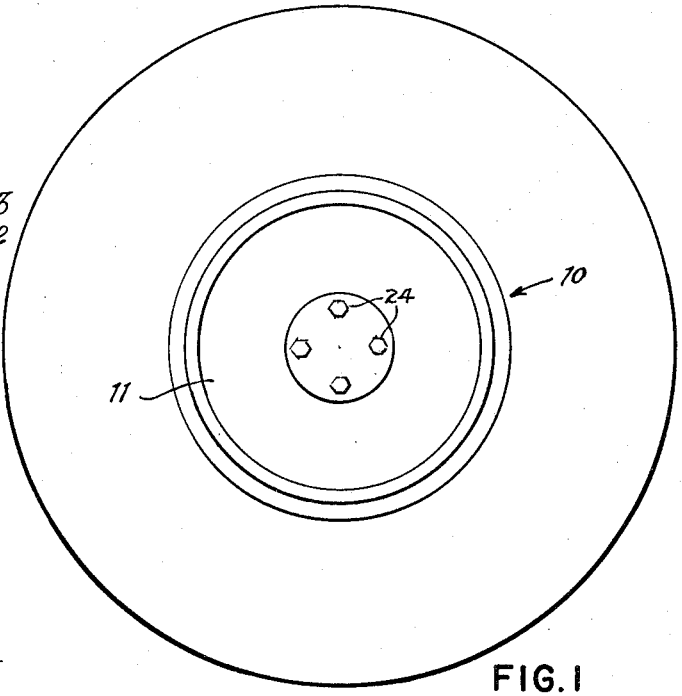
FIGURE 1 is a front elevation showing the traction device installed on an automobile wheel.

Referring more particularly to the drawings, FIGURE 1 shows the traction device 10, with cover plate 11, mounted on the hub 12 of wheel 13 of an automobile, said device being secured to the hub 12 by bolts and lug nuts 14 of conventional design.

Figures 2, 4:
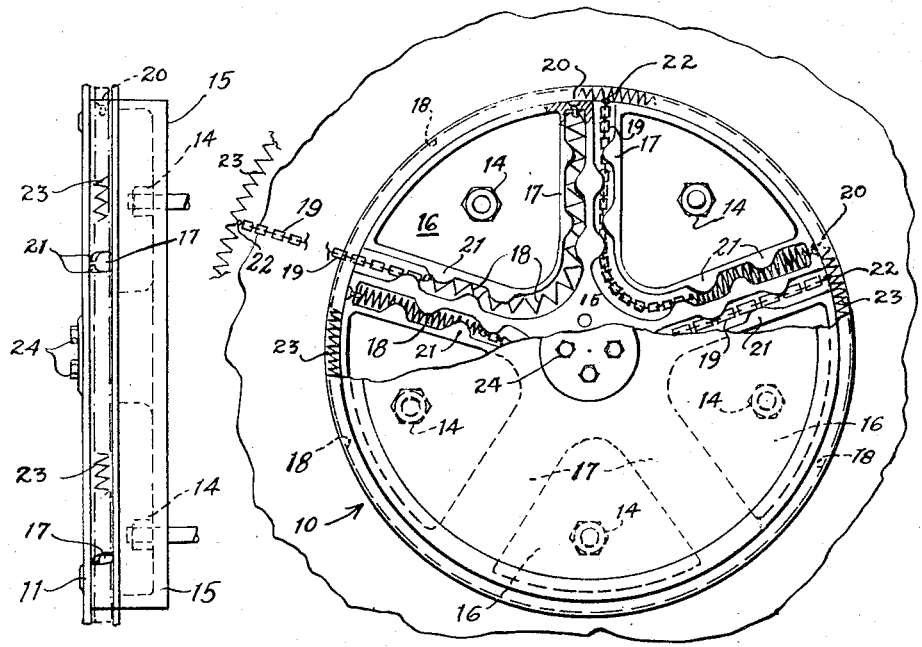
FIGURE 2 is a front elevational view, partly in section, illustrating the detail arrangement of the operating parts.
FIGURE 4 is an end elevation of the traction device.

In FIGURE 2, the base plate, or disc, 15 of the device 10 is shown with hub nuts 14 in spaces 16 between channels 17, each channel being adapted to accommodate a helical spring 18 and attached chain 19, and said springs 18 being secured to the base plate 15 by rivets 20. Lips or protrusions 21 hold the said spring and chain assembly firmly within said channel.

When in retracted, non-operating position, the tension of the springs 18 holds the chains 19 within the channels 17, the opposite end of each chain being attached as at 22 to an outer circumferential spring 23, which is held thereby in contact with the open ends of channels 17 along the periphery of base plate 15.

In operating position, as shown in FIGURES 5, 6, and 7, the spring 23 is drawn radially outward from the base plate 15 and over the tire to the inner, or rear, side thereof, and chains 19 are thus drawn into transverse position across the tread of the tire.

Positioning of the chains for operation is accomplished by turning the wheel, that is, moving the automobile, forward or back so that the spring 23 and following chains 19 may be drawn over and across the tread portion of the tire, being held in that position by circumferential spring 23, which lies upon the inner side of and in a plane with the wheel.

When the extension of the chains is completed and the device is in operating position, the spring 23 will assume an angular contour, shown in FIGURE 7, as a pentagon, being drawn taut at points 22 where chains 19 are attached.

When the automobile wheel turns and the cross chains are engaged by mud or snow, the chain or chains then bearing the stress of the mud or the snow will draw upon the mating spring or springs 18 and the circumferential spring 23.

The cover plate 11 is provided to retain and conceal the chains and springs, and protect them from encrustation of mud, ice or snow; it is secured to the base plate 15 by bolts and nuts shown at 24.

When the traction of cross chains is no longer required, the device may be returned from its operational position by a reversal of the steps described for extension thereof, that is, circumferential spring 23 is drawn over the tread of the tire, permitting retraction of springs 18 and chains 19 into channels 17; the wheel is then turned forward or backward to permit continued return of spring 23 over the tread of the tire to its position adjacent base plate 15 and retraction of springs 18 and chains 19, until all of said springs and chains are returned to their positions within channels 17.

FIGURES 8 and 9 show two views of a Y-shaped device or tool by which to facilitate the extension and retraction of said traction device. Said tool consists of a bifurcated member 25 having arms 26, 26 separated at the outer ends thereof and provided with barbs 27, 27 adapted to engage spring 23 approximately at points 22 and thus facilitate the pull upon chains 19 across the tread of the tire. Said tool terminates in handle 28.

It is obvious that changes may be made in the form and construction shown and described herein without departing from the spirit of the invention and within the scope of the appended claims, and I do not, therefore, desire to limit myself to the exact disclosure set forth herein.

What I claim as my invention and desire to secure by Letters Patent of the United States, is:

1. In a traction device for vehicles comprising, in combination, a base plate rigidly attached to the hub of an automobile on the outer side of the wheel, and having thereon pairs of connected radial channels, spring means attached to the ends of traction members lying within said channels, and other spring means attached to the opposite ends of said traction members and circumferentially holding the same at the periphery of said base plate.

2. An invention as claimed in claim 1, wherein said traction members may be extended by drawing said circumferential spring means over the tread of the tire until all of said traction members are fitted in spaced position transversely over the said tire tread, said circumferential spring means then lying tautly against the inner wall of said tire.

3. An invention as claimed in claim 1, wherein the frames of said channels are provided with protrusions extending inwardly and partially across the said channels.

4. In a traction device comprising a circular base plate mounted upon the hub of an automobile adjacent the wheel and on the outer side thereof, having pairs of radial channels connected at the ends thereof nearest the center of said base plate, chain and spring assemblies lying normally within said channels and being fastened, at the end of the spring opposite the chain, to the frame of the channel at the outer end thereof, and at the end of the chain opposite the spring, to a continuous spring following a generally circular path around the periphery of the base plate; said chains being extensible across the tread of the tire mounted on said wheel and being held thereacross by the tension of the said circumferential spring.

5. A traction device for vehicles comprising, in combination, a series of cross chains, each of said chains being attached at one end thereof to a helical spring, and said chain and spring assembly lying within a pair of radial channels connected at the innermost ends thereof to form a continuous channel and being mounted upon a circular base plate, the end of the said spring opposite the said chain being attached to the channel frame at one of the outer ends thereof; and a continuous helical spring attached to the other ends of said chains at the points where said chains terminate at the outer end of the other arm of each pair of radial channels, said continuous spring lying in a circumferential position around the edge of the base plate when said chains are retracted.

References Cited

UNITED STATES PATENTS

| | | | |
|---|---|---|---|
| 1,786,229 | 12/1930 | Conrow | 152—216 |
| 2,212,076 | 8/1940 | Rollings | 152—216 |

ARTHUR L. LA POINT, *Primary Examiner.*

C. W. HAEFELE, *Assistant Examiner.*